H. W. PARKER.
TRANSMISSION GEARING.
APPLICATION FILED SEPT. 15, 1916.

1,220,883.

Patented Mar. 27, 1917.
2 SHEETS—SHEET 1.

Witness
Wm. Conway

Inventor
Harry W. Parker,
By Foster and Webster
his Attorneys

H. W. PARKER.
TRANSMISSION GEARING.
APPLICATION FILED SEPT. 15, 1916.

1,220,883.

Patented Mar. 27, 1917.
2 SHEETS—SHEET 2.

Inventor
Harry W. Parker,

Witness
Wm. Conway.

By Foster and Webster
his Attorneys

UNITED STATES PATENT OFFICE.

HARRY W. PARKER, OF PHILADELPHIA, PENNSYLVANIA.

TRANSMISSION-GEARING.

1,220,883. Specification of Letters Patent. Patented Mar. 27, 1917.

Application filed September 15, 1916. Serial No. 120,232.

*To all whom it may concern:*

Be it known that I, HARRY W. PARKER, a citizen of the United States, residing at Philadelphia, in the county of Philadelphia and State of Pennsylvania, have invented certain new and useful Improvements in Transmission-Gearing, of which the following is a specification.

My invention relates to improvements in transmission gearing, an object of the invention being to provide a transmission gearing in which a pinion meshing with a stationary rack and carrying a crank arm imparts a rotary movement to a drive shaft while the end of the crank arm is moving in an elliptical path, and by reason of such movement permits a relatively long longitudinal movement of the driving member with a relatively short lateral movement so that the maximum of power and leverage can be utilized.

A further object is to provide a gearing of the character stated which is especially adapted as a power transmission for engines allowing an extremely long piston stroke to utilize the full expansion of steam or other motive fluid.

A further object is to provide a transmission gearing in which an elliptical motion is transformed into a circular motion.

With these and other objects in view the invention consists in certain novel features of construction and combinations and arrangements of parts as will be more fully hereinafter described and pointed out in the claims.

Figure 1:
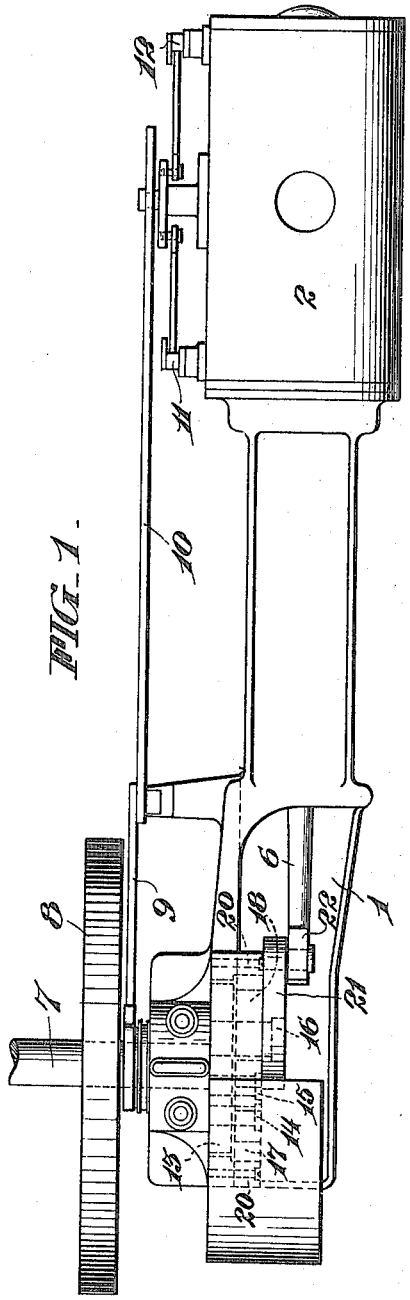
Figure 1 is a top plan view illustrating my improvements.

1 represents an engine bed, 2 the cylinder, 3 the piston, 4 the piston rod, 5 the cross head, and 6 the connecting rod of any ordinary engine. 7 is the drive shaft carrying fly-wheel 8 and operating rods 9 and 10 to control the valves 11 and 12.

The drive shaft 7 is provided on one end with a disk 13 which is provided with three journal pins 14, 15, and 16. These journal pins are in alinement and the outside pins 14 and 16 are located to one side of the center of the disk 13, and support driving pinions 17 and 18 respectively.

Figure 3:
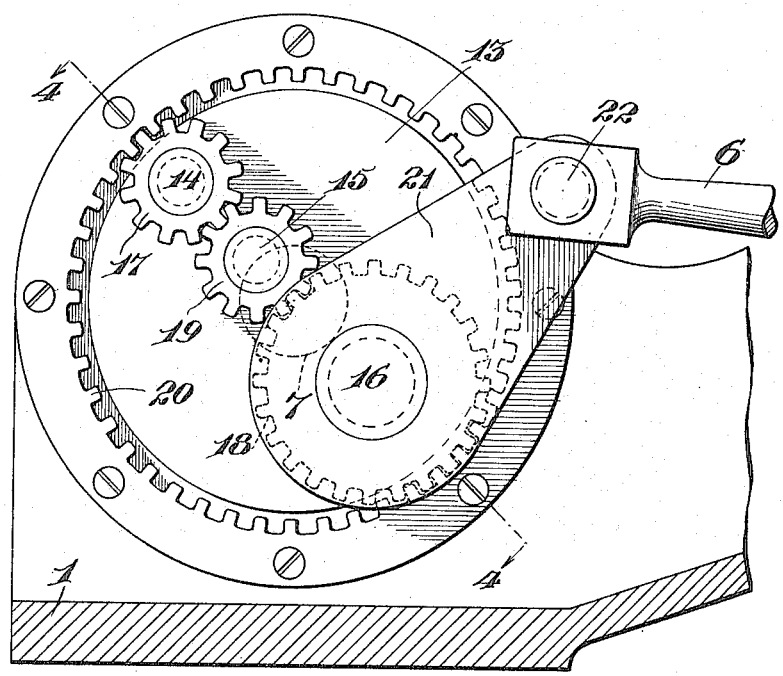
Fig. 3 is an enlarged view in side elevation illustrating my improved gearing.
Figure 4:
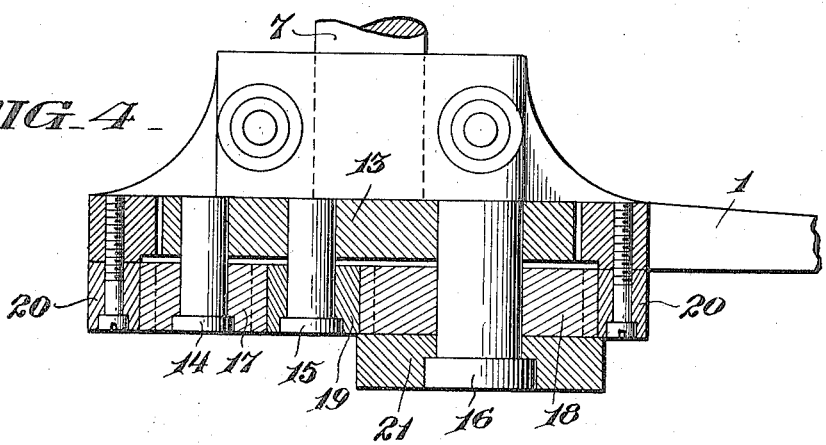
Fig. 4 is a view in section on the line 4—4 of Fig. 3.

An idle pinion 19 on journal 15 meshes with both pinions 17 and 18. The pinions 17 and 18 mesh with an internal stationary rack 20 secured to the engine bed 1. The pinion 18 contains half the number of teeth of rack 20 and is appreciably larger than pinions 17 and 19 as shown clearly in Fig. 3.

A crank arm 21 is fixed to pinion 18 and at its outer end is connected by a pin 22 with connecting rod 6. In operation, the motion imparted to the crank arm 21 by connecting rod 6, causes the pinion 18 to revolve and run around rack 20, imparting a rotary movement to disk 13 and shaft 7.

Figure 2:
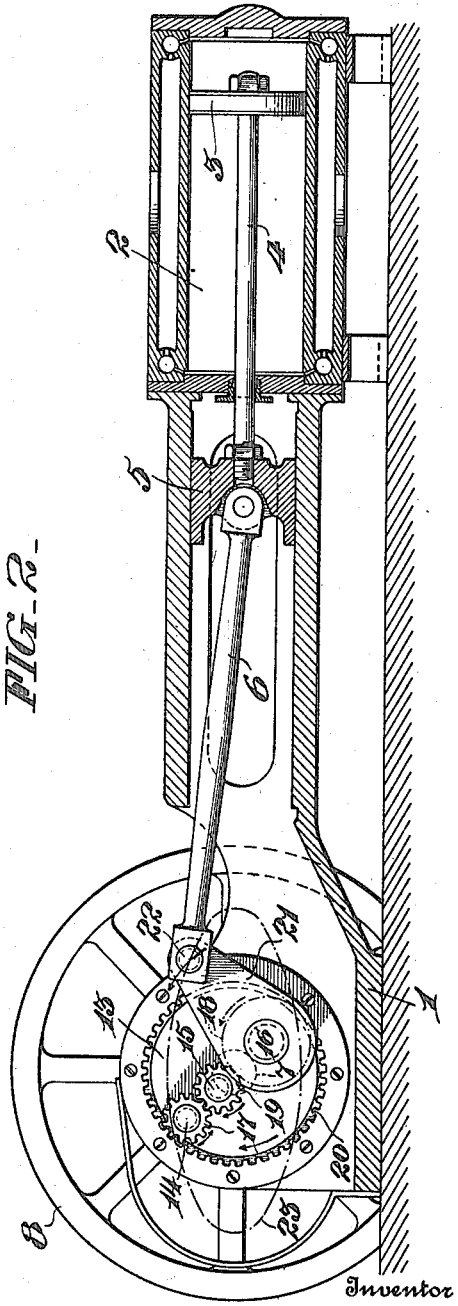
Fig. 2 is a view in side elevation partly in longitudinal section.

The pinion 17 also constitutes a driver and by arranging the pinions as shown, they are maintained in proper relative positions and a drive is had at opposite sides of the stationary rack. The pin 22 constituting the pivotal connection between crank arm 21 and connecting rod 6, travels in an elliptical path indicated by the dot and dash line 23 on Fig. 2. The major axis of said ellipse is disposed longitudinally so that the piston of the engine is permitted an extremely long stroke while a relatively short lateral movement is imparted to the connecting rod.

By reason of my transmission gearing as above described, I obtain a great leverage to utilize the full power of the motive force without materially increasing frictional resistance over transmissions in general use.

The journal pins 14 and 16 constitute crank pins on the crank disk 13 and I shall in the claims refer to these pins as crank pins, and the disk 13 is a crank disk, although I utilize no crank arm in the ordinary sense of this term.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. The combination with a stationary, internal, circular rack, a shaft located concentrically relative to the rack and carrying a crank pin, a pinion on the crank pin meshing with the rack, a gear train connecting the pinion with said rack, and an arm fixed to the pinion and constituting a drive member.

2. The combination with a circular, internal stationary rack, a shaft having a crank disk, a crank pin on the disk, a pinion on the crank pin meshing with the rack, a gear train connecting the pinion with said rack, and an arm fixed to the pinion and constituting a driving member.

3. The combination with a stationary, circular, internal rack, a crank disk, crank pins on the disk, pinions on the crank pins meshing with the rack, an idle pinion carried by the disk and meshing with both pinions, and an arm fixed to one of the first mentioned pinions and constituting a driving member.

4. The combination with a stationary, circular, internal rack, a shaft, a crank disk on the shaft located concentrically to the rack, a series of journal pins located in alinement on the disk, the two end pins constituting crank pins, pinions on the crank pins meshing with the rack, one of said pinions having half the number of teeth of the rack, an idle pinion connecting the pinions on the crank pins and a driving arm fixed to one of said pinions on the crank disk.

5. The combination with a stationary, circular internal rack, a shaft having a crank disk thereon, three pinions carried by the disk, two of which mesh with the rack, an arm fixed to one of the pinions and a driving member connected to the free end of the arm, said drive member at its point of connection with the arm movable in an elliptical path.

In testimony whereof I have signed my name to this specification in the presence of two subscribing witnesses.

HARRY W. PARKER.

Witnesses:
ELEANOR F. MURRAY,
WILLIAM CONWAY.

Copies of this patent may be obtained for five cents each, by addressing the "Commissioner of Patents, Washington, D. C."